United States Patent [19]

Morgan

[11] Patent Number: 4,915,883

[45] Date of Patent: Apr. 10, 1990

[54] METHOD OF AND APPARATUS FOR PURGING AN ANNULAR BAYONET

[75] Inventor: Richard E. Morgan, Huntsville, Ala.

[73] Assignee: Morton Thiokol, Inc., Chicago, Ill.

[21] Appl. No.: 81,201

[22] Filed: Aug. 3, 1987

[51] Int. Cl.⁴ .............................................. C06B 21/00
[52] U.S. Cl. ..................................... 264/3.4; 264/3.1; 86/20.12; 86/45; 102/291
[58] Field of Search ................... 264/3.1, 3.3, 3.4; 86/20, 12, 45; 102/291

[56] References Cited

U.S. PATENT DOCUMENTS

| | | | |
|---|---|---|---|
| 3,222,433 | 12/1965 | Makay, Jr. ........................... | 264/3 |
| 3,405,201 | 10/1968 | Roach .................................. | 264/3 |
| 3,890,877 | 6/1975 | Lista et al. ........................ | 264/3.1 X |
| 3,952,627 | 4/1976 | Gardiner et al. ................. | 264/3.1 X |
| 4,103,584 | 8/1978 | Lista et al. ........................ | 264/3.1 X |
| 4,154,141 | 5/1979 | Sayles ................................. | 264/3.1 X |
| 4,503,773 | 3/1985 | Bolieau .............................. | 102/287 |

Primary Examiner—Peter A. Nelson
Attorney, Agent, or Firm—Gerald K. White

[57] ABSTRACT

An annular bayonet vacuum cup allows a vacuum to be pulled on an annular bayonet and the bayonet to be filled with propellant that is devoid of air. The vacuum cup is transparent/translucent and allows the propellant to be seen as it leaves the exit end of the bayonet. This alerts an operator to cut off the vacuum pressure thereby to keep the excess of propellant flow to a minimum, which excess drops into the vacuum cup and is prevented from contaminating the vacuum line. The vacuum cup is disposable (an O-ring sealing ring being reusable) and eliminates propellant clean-up.

16 Claims, 1 Drawing Sheet

METHOD OF AND APPARATUS FOR PURGING AN ANNULAR BAYONET

BACKGROUND OF THE INVENTION

1. Field of the Invention

This invention relates to the pressure casting of solid propellant rocket motors, and in particular, to such casting where the solids and the liquids of the propellant are mixed although uncured prior to loading in a motor.

2. Description of the Prior Art

Various forms of apparatus for use in casting uncured propellant in the motor case of a solid propellant rocket motor are known in the prior art. One such apparatus, as disclosed in U.S. Pat. No. 3,186,035 granted on June 1, 1965 to G. K. Grace and assigned to the assignee of the present invention, includes a core and surrounding barrier sleeve that are concentrically positioned within the motor case. The apparatus is intended for use in large motors such as a monolithic shuttle booster containing 100,000 pounds of propellant or more, and involves pulling of the core during loading. When the core and barrier are in position, the uncured propellant is cast into the motor case by means of a casting bayonet. The casting bayonet disclosed is of a type known in the art as a "fire hose bayonet." This bayonet allows propellant to flow around the core but does not place the propellant uniformly around the core. That is to say, the propellant must flow from where it is deposited to the other side of the core.

In my pending application Ser. No. 000288 filed jointly with C. B. Dye, on Jan. 2, 1987 and the disclosure of which by reference is incorporated herein, there is disclosed a bayonet, hereinafter termed an "annular bayonet," for casting uncured solid propellant in solid propellant rocket motors in which the exit end is modified so that exiting propellant passes through thin annular slit-like openings. The propellant, being a non-Newtonian Power Law fluid, becomes more fluid flowing through thin slits than through a circular opening. This improves the fluidity and self-leveling behavior of the fluid. Both of these effects promote the elimination or reduction of a tendency for air to be trapped in the cast propellant and enables uniform placement of the propellant around the core. The annular bayonet has particular utility for small tactical motor castings which typically hold 100 pounds or less of propellant.

There has been a problem in the prior art in the use of the annular bayonet in respect of a tendency for pockets of air to adhere to the inner cylindrical wall thereof even after pressure purging with propellant, that is, running propellant in excess amounts through the bayonet to sweep out the air. Such trapped pockets of air eventually come out, however, and form voids in the cast propellant. Another problem, in this connection, aside from the waste of propellant involved and the cost thereof, is the disposal of such waste propellant and the cost of such disposal.

Thus, there is a need and a demand for improvement in the method of and apparatus employed for purging the annular bayonet of air preparatory to the use thereof in the pressure casting of propellant in a rocket motor to the end of eliminating voids in the cast propellant and minimizing the cost of purging, which cost not only involves propellant wastage but also clean-up. The present invention was devised to fill the technological gap that has existed in the art in these respects.

SUMMARY OF THE INVENTION

An object of the invention is to provide an improved method of and apparatus for purging an annular bayonet of air while filling it with propellant preparatory to pressure casting uncured propellant in a rocket motor casing.

Another object of the invention is to provide such an improved method and apparatus which involves a minimum of propellant wastage and eliminates the necessity for clean-up of waste propellant.

A further object of the invention is to provide a disposable annular bayonet vacuum cup that enables a vacuum to be pulled on an annular bayonet and the bayonet to be filled with propellant.

Still another object of the invention is to provide such an annular bayonet vacuum cup that is so inexpensive to fabricate that economically it is feasible to discard it after but a single use.

In accomplishing these and other objectives of the invention, there is provided a disposable plastic annular bayonet vacuum cup, including a conical cup having the general configuration of a beaker with a strengthening flange around the upper end or mouth thereof. The plastic conical cup is made of a material that is transparent or translucent, that is, a material that allows the passage of light therethrough.

A rigid plastic tube extends inwardly of the cup through the center of a circular flat bottom thereof, at an angle to the bottom of the cup of approximately 90°. The plastic tube is sealed to the bottom of the cup in any suitable manner and extends into the cup for a distance approximately equal to half the height of the cup.

The diameter of the open end of the conical cup is so proportioned relatively to the diameter of the propellant exit end of the annular bayonet with which the annular bayonet vacuum cup is to be used that, when brought into operative engagement with the cup, the propellant exit end of the annular bayonet rests on the inside conical wall of the cup at a distance therein of about a quarter of the height of the cup. A rubber O-ring around the outer circumference of the annular bayonet exit end provides a seal at the mouth of the cup.

With an annular bayonet connected to a supply of propellant and brought into operative engagement with the mouth of the annular bayonet vacuum cup, as described, and with vacuum pressure applied to the end of the plastic tube external of the annular bayonet vacuum cup, air initially is exhausted from the annular bayonet. Such exhaustion of air from the annular bayonet breaks loose any air pockets that might tend to remain therein. As the annular bayonet is being exhausted of air, propellant is pulled into the annular bayonet from the supply of propellant. The emergence of the propellant through the annularly arranged slits in the propellant exit end of the annular bayonet is immediately visible through the transparent/translucent cup. This alerts an operator to cut off the vacuum pressure to stop any further flow of propellant into the cup through the annular bayonet out of the propellant exit end.

Any excess of propellant through the annular bayonet greater than that required to completely fill the annular bayonet falls down under the force of gravity into the bottom of the cup. It is noted that such excess propellant exiting the annular slits of the annular bayonet surrounds the upper end of the plastic tube in the cup with the result that there is no tendency for such excess propellant to fall into the open end of the plastic tube or to be pulled thereinto by vacuum pressure.

When the annular bayonet has been so filled with propellant and the vacuum pressure has been cut off, the annular bayonet may be withdrawn from the annular bayonet vacuum cup. After retrieving the O-ring which is reusable, the annular bayonet vacuum cup may be discarded. This eliminates the need for clean-up of waste propellant. Additionally, since the propellant is seen immediately upon its emergence from the propellant exit end of the annular bayonet and such propellant flow may be quickly stopped by discontinuing the vacuum pressure applied to the plastic tube, the excess propellant that flows into the cup may be kept at such a small amount as to remain well within the confines of the cup.

The various features of novelty which characterize the invention are pointed out with particularity in the claims annexed to and forming a part of the specification. For a better understanding of the invention, its operating advantages, and specific objects attained by its use, reference is made to the accompanying drawing and descriptive matter in which a preferred embodiment of the invention is illustrated.

BRIEF DESCRIPTION OF THE DRAWINGS

With this description of the invention, a detailed description follows with reference being made to the accompanying figures of drawing which form part of the specification in which like parts are designated by the same reference numbers, and of which.

DESCRIPTION OF THE PREFERRED EMBODIMENT

Figures 1, 2:
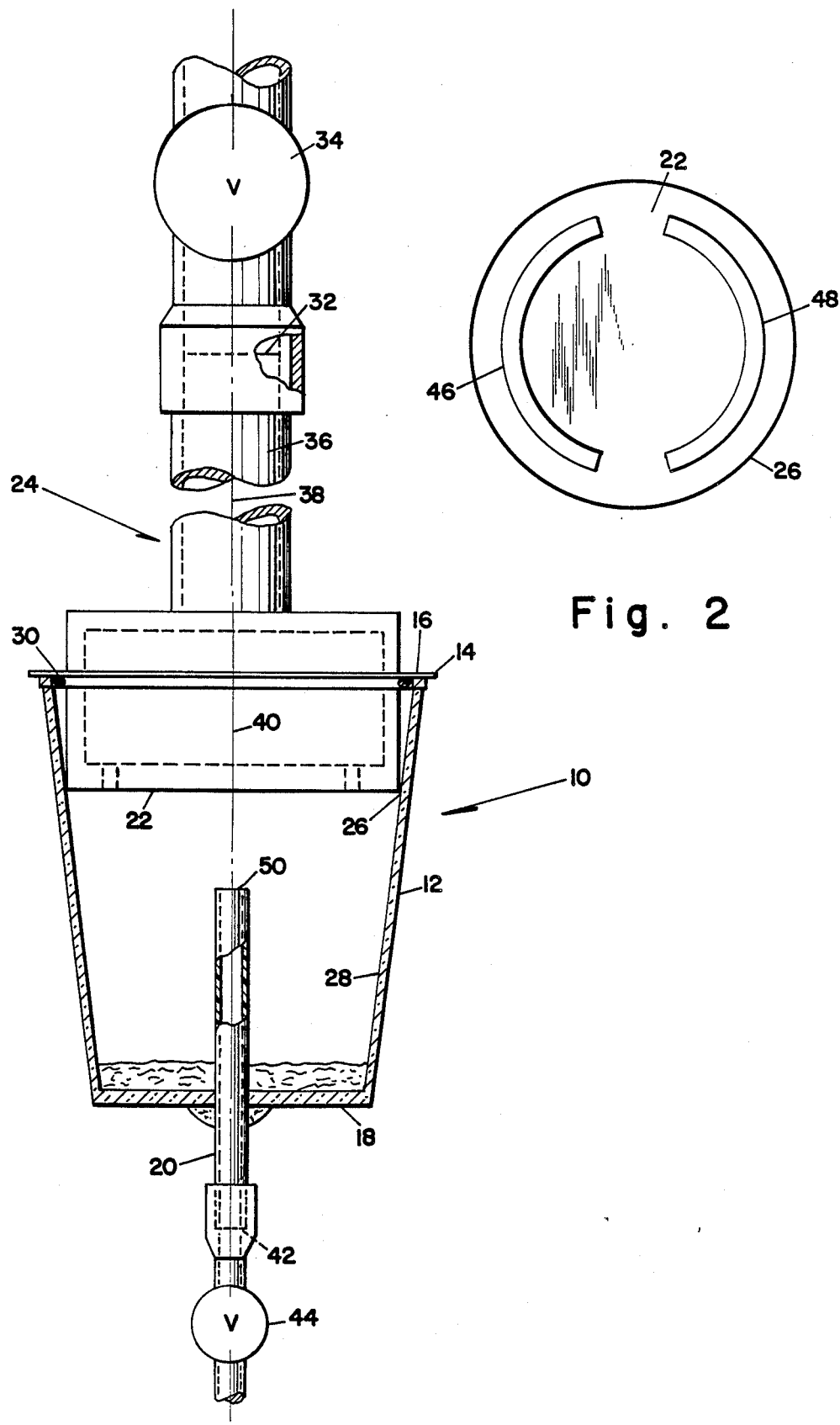
FIG. 1 is a fragmentary view, partly in cross section, showing the exit end of an annular bayonet installed in the annular bayonet vacuum cup of the present invention.
FIG. 2 is a view of the propellant exit end of the annular bayonet of FIG. 1 and shows the annular slits therein.

Referring to FIG. 1 of the drawings, the reference numeral 10 designates the annular bayonet vacuum cup according to the invention. The annular bayonet vacuum cup 10 comprises a transparent/translucent conical plastic cup or beaker 12 having an integral strengthening flange 14 around the upper end or mouth 16. Extending upwardly through the center of the circular bottom 18 of the cup 12 along the longitudinal axis at an angle of approximately 90° is a short, rigid plastic tube 20. Tube 20 is sealed to the bottom 18 of cup 12 in any suitable manner, as for example, by conventional potting or sealing compound. Tube 20 extends into cup 12 for a distance approximately half of the height of the cup 12 and extends in the other direction away from the bottom 18 of the cup 12 for a similar distance.

The diameter of the upper end or mouth 16 of the cup 12 is so proportional relatively to the diameter of the propellant exit end 22 of an annular bayonet 24 with which the annular bayonet vacuum cup 10 is to be used that, when brought into operative engagement as illustrated in FIG. 1, the lower circular edge 26 of the annular bayonet exit end 22 rests on the inside conical wall 28 of cup 12. A rubber O-ring 30 provides a seal at the mouth 16 of the cup 12. The annular bayonet 24 includes in addition to the exit end 22 an entry end indicated at 32 for connection through a valve 34 to a source (not shown) of uncured propellant and a straight pipe 36 that connects the entry end 32 to the exit end 22. Pipe 36 includes a longitudinal axis 38 that is in alignment with a longitudinal axis 40 of cup 12 when the annular bayonet 24 is positioned in operative relationship with the conical cup 12, as seen in FIG. 1.

The end 42 of plastic tube 20 remote from the conical cup 12 is connected through a valve 44 to a vacuum line or vacuum pressure source (not shown). With valve 44 open and valve 34 closed, air is exhausted from the conical cup 12 and from the pipe 36 of the annular bayonet 24. A sufficient time is allowed to substantially completely evacuate the conical cup and annular bayonet 24 before valve 34 is opened to allow propellant to flow into the entry end 32 of the annular bayonet. Exhaustion of air under vacuum pressure is effective to break loose any pockets of air that might tend to adhere to the inner walls of the annular bayonet 24, and which, if not eliminated, would result in the production of voids in the cast propellant.

After the conical cup 12 and annular bayonet 24 have been exhausted of air the valve 34 is opened and propellant is pulled from the source thereof into the annular bayonet 24 by vacuum pressure. When completely filled with propellant, any excess propellant drawn into the annular bayonet 24 emerges through annular slits 46 and 48 in the propellant exit end 22 of the annular bayonet 24. Such emergence of propellant from the annular bayonet 24 through the slits 46 and 48 is immediately visible through the transparent/translucent cup 12. Having been on the alert for such emergence of propellant, an operator can quickly take the necessary action of closing valve 44 to cut off the vacuum pressure and of closing valve 34 thereby to minimize any excess propellant that is pulled into the conical cup 12.

A feature of the invention is that the upper end of the plastic tube 20 is centrally located relatively to the annular slits 46 and 48 in the exit end 22 of bayonet 24 with the diameter of the plastic tube 24 being substantially less than the diameter of the circle on which the annular slits 46 and 48 are positioned. As a consequence of the annular slits 46 and 48 being symmetrically located with respect to the plastic tube 20 and the longitudinal axis 40 of the cup 12, any excess propellant flowing into cup 12 through the annular slits 46 and 48 drops to the bottom 18 of the cup 12 in a generally cylindrical configuration that surrounds the upper end 50 of the plastic tube 20. Thus, there is no tendency for such excess propellant flow to fall into the open end 50 of the plastic tube 20, nor for such excess propellant to be drawn into the upper end 50 of the plastic tube 20 by vacuum pressure and contaminating the vacuum line to which the tube 20 is connected.

Having thus been purged of air and completely filled with propellant, the vacuum pressure to the plastic tube 24 having been cut off, the annular bayonet 24 may be removed from the annular bayonet vacuum cup 10 and applied to the pressure casting of uncured propellant in the casing of a solid propellant rocket motor. The annular bayonet vacuum cup 10 with the attached tube 20 may then be discarded, the O-ring being retained, however, since it is reusable. This eliminates the need for clean-up.

By way of illustration and not limitation, it is noted that, in one operative embodiment of the invention, the conical cup 12 comprised a 250 milliliter beaker having an internal height of about 80 millimeters, an internal diameter at the upper end 16 of about 73 millimeters, and an internal diameter at the bottom of about 55 millimeters with the plastic tube 22 having a length of about 100 millimeters. The outer diameter of the propellant exit end 22 of the annular bayonet 24 with which the annular bayonet vacuum cup 10 was used has a diameter of about 67 millimeters with the annular slits 46 and 48 therein being disposed on a circle having a diameter of about 47 millimeters. The diameter of the plastic tube 20 is about 7 millimeters.

Thus, in accordance with the invention, there is provided an improved method of and apparatus for purging an annular bayonet of air preparatory to the use thereof in the pressure casting of a rocket motor thereby to eliminate the formation of voids in the cast propellant. The method and apparatus are further characterized in not only effecting a reduction in propellant wastage during such purging, but also in eliminating the necessity for clean-up while preventing contamination of the vacuum line.

What is claimed is:

1. A method of purging an annular bayonet for use in the pressure casting of a solid propellant rocket motor with uncured propellant, said annular bayonet having an entry end for propellant and an exit end for propellant, comprising the steps of:
   (a) connecting the entry end of the annular bayonet to a source of uncured propellant;
   (b) placing the exit end of the annular bayonet in sealed engagement with the mouth of a conical cup, said cup being made of a material a portion at least of which allows the passage of light therethrough;
   (c) applying vacuum pressure to the interior of said conical cup to exhaust air therefrom and from said annular bayonet;
   (d) upon the emergence of propellant from the exit end of said annular bayonet, as externally visible through the material of said annular bayonet vacuum cup, cutting off the vacuum pressure to said conical cup;
   (e) disengaging said annular bayonet from said conical cup; and
   (f) discarding said conical cup, thereby eliminating the necessity for clean-up of waste propellant.

2. A method as defined by claim 1 wherein said conical cup has a flat bottom, and wherein vacuum pressure is applied to the interior of said conical cup and to said annular bayonet through a plastic tube that extends into and is sealed to the flat bottom of said conical cup.

3. A method as defined by claim 2 wherein said conical cup has a longitudinal axis,
   wherein said plastic tube extends into said conical cup in alignment with said longitudinal axis, and
   wherein the exit end of said annular bayonet is disposed in said conical cup in spaced relation with the end of the plastic tube therein in alignment with said longitudinal axis of said conical cup.

4. A method as defined by claim 3 wherein the exit end of said annular bayonet includes annular slits that are positioned symmetrically with respect to the longitudinal axis of said conical cup, said annular slits being positioned on a circle of diameter substantially larger than the diameter of the end of said plastic tube in said conical cup.

5. A method as defined by claim 1 wherein said annular bayonet is sealed in engagement with the mouth of the conical cup by an O-ring.

6. An annular bayonet vacuum cup for purging air from an annular bayonet, said annular bayonet having an entry end to which propellant is supplied and an exit end from which propellant emerges, comprising,
   a conical cup having a mouth, a flat bottom, and a longitudinal axis, and being made of a material a portion at least of which allows the passage of light to render the interior thereof visible exteriorly of the said conical cup, the configuration of said mouth of said conical cup being such relatively to that of the exit end of the annular bayonet as to receive the exit end thereof in sealing relation,
   a rigid plastic tube extending into said conical cup along said longitudinal axis through said flat bottom, said plastic tube being sealed to said flat bottom and extending externally of said conical cup for connecting to a source of vacuum pressure, and
   means operable to seal said mouth of said conical cup to the exit end of the annular bayonet when such is received therein.

7. An annular bayonet vacuum cup as defined by claim 6 wherein said means operable to seal said mouth of said conical cup to the exit end of the annular bayonet comprises an O-ring.

8. An annular bayonet vacuum cup as defined by claim 6 wherein said conical cup is made of a transparent material.

9. An annular bayonet vacuum cup as defined by claim 6 wherein said conical cup is made of a translucent material.

10. An annular bayonet vacuum cup as defined by claim 6 wherein the structure of said conical cup is such that the exit end of the annular bayonet is received in said mouth thereof along said longitudinal axis in spaced relation to the end of said plastic tube therein.

11. An annular bayonet vacuum cup as defined by claim 6 wherein said plastic tube is sealed to the flat bottom of said conical cup with potting compound.

12. Apparatus for purging a bayonet for use in pressure casting of a solid propellant rocket motor with uncured propellant comprising,
   a pipe having a first longitudinal axis, an entry end for uncured propellant and an exit end therefor, said exit end having a plurality of annular slits formed therein, said annular slits being of substantially the same size and being evenly displaced from each other on the said circle, which circle is positioned transversely of the longitudinal axis of said pipe
   a conical cup having a mouth, a flat bottom, and a second longitudinal axis and being made of a material a portion at least of which allows the passage of light to render the interior thereof visible exteriorly of the cup, the configuration of the mouth of said conical cup being such relatively to that of the exit end of said pipe as to receive the exit end of said pipe in sealing relation with the said first longitudinal axis of said pipe in alignment with the said second longitudinal axis of said conical cup,
   a rigid plastic tube extending into said conical cup through said flat bottom thereof along said second longitudinal axis toward the exit end of said pipe, but out of contact therewith, said plastic tube being sealed to said flat bottom and extending externally of said conical cup for connection to a source of vacuum pressure, and
   means operable to seal said mouth of said conical cup to said exit end of said pipe,
   whereby when said exit end of said pipe is received in said mouth of said conical cup and sealed therein, and vacuum pressure is applied to said plastic tube, air is exhausted from said conical cup and from said pipe and propellant is pulled into said pipe to completely fill said pipe with propellant that is devoid of air, emergence of propellant from the exit end of said pipe as seen externally of said conical cup providing an indication that said pipe is completely filled with propellant and that the vacuum pressure should be cut off, said conical cup and attached plastic tube being disposable thus eliminating the necessity for propellant clean-up.

13. Apparatus as defined by claim 12 wherein the means operable to seal said mouth of said conical cup to the exit end of said pipe comprises an O-ring.

14. Apparatus as defined by claim 12 wherein said conical cup is made of a transparent material.

15. Apparatus as defined by claim 12 wherein said conical cup is made of a translucent material.

16. Apparatus as defined by claim 12 wherein the diameter of the circle on which the annular slits in the exit end of said pipe are positioned is substantially greater than the diameter of said plastic tube that extends into said conical cup whereby excess propellant that is pulled through said pipe into said conical cup drops to the bottom of said conical cup in surrounding relation to said plastic tube with no tendency to fall into the open end of said plastic tube or to be drawn thereinto by vacuum pressure.

* * * * *